United States Patent [19]

Chuang

[11] Patent Number: 4,766,566
[45] Date of Patent: Aug. 23, 1988

[54] PERFORMANCE ENHANCEMENT SCHEME FOR A RISC TYPE VLSI PROCESSOR USING DUAL EXECUTION UNITS FOR PARALLEL INSTRUCTION PROCESSING

[75] Inventor: Chiao-Mei Chuang, Briarcliff Manor, N.Y.

[73] Assignee: International Business Machines Corp., Armonk, N.Y.

[21] Appl. No.: 896,156

[22] Filed: Aug. 18, 1986

[51] Int. Cl.$^4$ .................................................. G06F 9/38
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 3,886,523 | 5/1975 | Ferguson et al. | 364/200 |
| 4,393,468 | 7/1983 | New | 364/200 |
| 4,476,525 | 10/1984 | Ishii | 364/200 |
| 4,569,016 | 2/1986 | Hao et al. | 364/200 |
| 4,589,065 | 5/1986 | Auslander | 364/200 |

OTHER PUBLICATIONS

ACM SIGARCH Computer Architecture News, vol. 10, No. 2, Mar. 1982, pp. 39–47, Radin, G., "The 801 Minicomputer".
IBM J. Res. Develop., vol. 27, No. 3, May 1983, pp. 237–246, Radin, G., "The 801 Minicomputer".
IEEE Proc. of the Eighth Annual Symposium on Computer Architecture, Minneapolis, May 1981, pp. 443–449, "RISC I: A Reduced Instruction Set VLSI Computer".

*Primary Examiner*—Raulfe B. Zache
*Assistant Examiner*—Eric Coleman
*Attorney, Agent, or Firm*—C. Lamont Whitham; Michael E. Whitham

[57] ABSTRACT

Performance of a VLSI processor of the reduced instruction set computer (RISC) type is enhanced by executing two instructions simultaneously in the two execution units of the processor. There is very little increase in the cost of hardware. Three embodiments are presented with different cost and performance capabilities. The first embodiment has an instruction input to an instruction buffer (10) and two sets of control ROSs (40 and 42) and control registers (64 and 65). The control ROS and control register which is chosen depends on which instruction execution unit is to execute the instruction. Data inputs to the execution units is from a register file (48) which has an additional pair of outputs (51) and (53) that provide the data paths for simultaneous execution of instructions by the execution units. Execution unit I has an arithmetic and logic unit (ALU) (24), while execution unit II has a rotate (26) and mask generator (31). Load balancing between the two execution units can be performed by adding a multiplier (60) and divider (62) to execution unit II. In the second embodiment, additionally, load balancing is achieved by incorporating an adder (78) into execution unit II. The adder (78) is used to perform address calculations to speed up the load, store and branch instructions. In the third embodiment, an additional ALU (90) is added to execution unit II to allow the instruction processing to be further balanced between the two execution units.

18 Claims, 7 Drawing Sheets

PERFORMANCE ENHANCEMENT SCHEME FOR A RISC TYPE VLSI PROCESSOR USING DUAL EXECUTION UNITS FOR PARALLEL INSTRUCTION PROCESSING

BACKGROUND OF THE INVENTION

1. Field of the Invention

The present invention generally relates to reduced instruction set computers (RISC) and, more particularly, to enhancing the performance of RISC processors, employing little additional hardware. Two examples of RISC technology are presented in detail in the articles (1) "The 801 Minicomputer," by George Radin and (2) "RISC I: A reduced Instruction Set VLSI Computer," by Patterson and Sequin. The complete bibliographic information for these two articles is presented more fully below.

In the semiconductor industry, current developments indicate that very large-scale integration (VLSI) has two avenues for microprocessor designers to choose from. The first is to develop increasingly complex microprocessors. The complexity is built into the hardware as more function is moved from software into the hardware. The second approach is to develop increasingly fast processors doing simple functions. This approach requires software to implement most of the function. The two articles mentioned above advocate the second approach.

VLSI circuits of greater complexity let designers use less expensive alternatives to expensive software. Hardware solutions also execute faster. Hardware implementations of software functions allow programmers to develop high-level language programs that are concise, efficient and easier to write, compile and debug.

The drawbacks to the first approach are that increasing complexity requires longer design times, a greater possibility for design errors and diverse implementations. This class of computers is referred to as complex instruction set computing (CISC) systems.

A unique approach to system architecture has been realized by following the second approach; i.e., a RISC system. The heart of this design is its CPU. The design of the system allows the user to use the major functions of the CPU. The organization differs from the CISC systems.

Mid-range central computing units (CPU)s are generally designed as microprocessors emulating the architecture of the CPU. This requires each instruction to map to several microcomputer instructions. The number of instructions necessary to execute each CPU instruction varies, depending on the power of the underlying microprocessor, the complexity of the CPU architecture and the application. For instance, an IBM S/370 model 168 will require three to six cycles per S/370 instruction.

Different application types have diverse instruction usages. For instance a computer aided design application will use floating point instructions and a check processing application will use decimal arithmetic. In most applications, there is a similarity in the most popular instructions. These instructions tend to be the simpler functions, such as load, store, branch, compare, integer arithmetic and logic shifting. These same functions are generally available on the microprocessor.

To better exploit the available functions, the primitive instruction set designed for the primitive reduced instruction set machine (PRISM) system can be directly executed by hardware. Every primitive instruction takes exactly one machine cycle. Complex functions are implemented in "microcode" similar to CISC implementations. This means they are implemented by software subroutines executing the primitive instruction set.

In a CISC implementation, the architect decides in advance which functions will be used most frequently. For example the decimal multiply function will reside in control storage while the Interrupt Handlers will be in main memory. With an instruction cache, recent usage dictates which functions will be available quickly.

This approach provides worst case capabilities equivalent to a moderately priced CPU in which the complex instructions have been microprogrammed. However, by choosing the primitive instructions with the compiler in mind, far fewer cycles are actually required.

The information presented above is intended to present the architecture of the RISC processor. For more detailed information other applications and issued patents include:

(1) U.S. Pat. No. 4,589,087 issued May 13, 1986, to M. A. Auslander, J. Crocke, H. T. Hao, P. W. Markstein, and G. Radin for "Condition Register Architecture For A Primitive Instruction Set Machine."

(2) U.S. Pat. No. 4,589,065 issued May 13, 1986, to M. A. Auslander, J. Croke, H. Hao, P. W. Markstein and G. Radin for "Mechanism for Implementing One Machine Cycle Executable Trap Instructions in a Primitive Instruction Set Computing System."

(3) U.S. patent application Ser. No. 509,734, now abandoned entitled "Mechanism for Implementing One Machine Cycle Executable Branch-On-Bit-In-Any-Register Instructions in a Primitive Instruction Set Computing System," by M. A. Auslander, H. Hao, P. W. Markstein, G. Radin and W. S. Woreley.

(4) U.S. Pat. No. 4,569,016 issued Feb. 4, 1986, to H. Hao, P.W. Markstein and G. Radin for "Mechanism for Implementing One Machine Cycle Executable Mask and Rotate Instructions in a Primitive Instruction Set Computing System."

(5) U.S. patent application Ser. No. 566,925, entitled "Internal Bus Architecture for a Primitive Instruction Set Machine," by J. Cocke, D. Fiske, L. Pereira and G. Radin.

2. Description of the Prior Art

The technology of the RISC computer is presented in two articles. These are:

(1) "The 801 Minicomputer," by George Radin, published in ACM SIGPLAN NOTICES, Vol. 17, No. 4, Apr. 1982, pages 39-47.

(2) "RISC 1: a Reduced Instruction Set VLSI Computer," in the IEEE 8th Annual Symposium on Architecture Conference Proceedings of May 12-14, 1981, pages 443-449.

The RISC computer is an instruction driven digital computer. This type of computer manipulates data to a user's specification. The user's specifications are organized into a program consisting of groups of the instructions.

The program is processed by a compiler to create an object deck. The object deck is linked with a set of other object decks to create an executable module that is in machine language. Machine language is the information that the particular hardware recognizes as instructions for it to execute.

The earliest compilers were principally interested in translating the language that the user developed the application in into machine language. As compilers became more sophisticated, they began to use optimization techniques to allow programs to execute more efficiently and faster. As optimization techniques became more refined, they began to take the target architecture into account more.

Until the RISC computer, there was always one drawback to compilers. The machine architecture was designed to optimize machine language instructions. With the advent of the RISC machine, the compiler was taken into account as the machine was designed. The RISC machine runs optimally with compiled procedures. The instructions that are generated by the compiler are designed to be executed sequentially, one or more at a time, to carry out the operation the user defined.

A typical data flow in a RISC processor consists of two fundamental execution units, the Arithmetic/Logical Unit (ALU) and the Rotate (shift) Unit. Instructions are executed sequentially by sharing output ports and using one of the units at a time. Most instructions only use one of the execution units.

Some RISC systems have branch prediction capability. In a branch prediction system, an instruction is fetched from storage and predecoded to look for branch instructions. If the instruction is a branch, the branch is processed. If not, the instruction is sent on to the processor. The processor never sees a branch instruction.

It is known that high performance can be achieved by duplicating computational units each performing identical operations in synchronism. This art is primarily used in scientific vector processors and is very costly. The principles and methods of such art are taught, for example, in U.S. Pat. No. 3,346,851 to James E. Thornton and Seymour R. Cray.

It is further known that some functional units of work can be separated into independent, distinct units to permit different operations to be performed on the same information at the same time. This is important because many operations lend themselves to specialization such as checks and comparisons on work in progress. By dividing out this work, it is possible to perform these specialized operations at the same time as other operations are occurring and avoid impacting the performance of the processor by carrying these operations out at another time. This art is presented more completely in U.S. Pat. No. 3,969,702 to Giancarlo Tessera.

It is also known that an instruction pipeline can be employed to process instructions in a time-offset between instructions. The offset is an integral multiple of the cycle time of the functional units which execute the instructions. The offset is matched to instructions that use two storage accesses per execution and each access requires one cycle. This art is presented more completely in U.S. Pat. No. 3,840,861 to Gene M. Amdahl, Glen D. Grant and Robert M. Maier.

A number of instruction processing techniques are known in prior art systems; however, there is a need for the improvement of the cost/performance ratio for RISC processor systems.

SUMMARY OF THE INVENTION

It is therefore an object of the present invention to provide a cost effective technique for increasing the processor performance of a RISC processor.

It is a further object of the invention to provide an improved RISC computer which is capable of executing instructions at twice the speed of known RISC computers.

It is another object of this invention to provide a novel RISC architecture that substantially increases the speed of operation yet requires little additional chip real estate.

According to the invention, these objects are accomplished by providing an improved RISC processor which is characterized by the feature of separating the instructions into two major classes of instructions and performing two instructions (one of each class) at a time. The RISC processor is divided into two execution units capable of executing a subset of the total instruction set. The total instruction load can be divided into classes of instructions that will execute on one of the two execution units. A particular advantage of the RISC architecture is that most instructions execute in one cycle. The invention provides the necessary hardware organization to allow instructions to be distributed between each of the two execution units. The execution units execute simultaneously. The hardware organization comprises an instruction buffer, control read only storage and control registers and instruction execution apparatus. The instruction execution apparatus comprises a register file having inputs and outputs, staging registers, a first and second execution unit and output registers. The first execution unit comprises an arithmetic logic unit and the second execution unit comprises a rotator and mask generator.

The processor pipeline starts with the decoding of the instruction. During the instruction decode cycle, the register file is accessed and the fetched operands are latched at staging registers in parallel with the decoding of the instruction by the two control ROSs and latching of instruction information into the two sets of the control registers. Next, the staging registers feed into one of the two execution units. The results of the execution are written into the register file in the put away stage of the pipeline. The control ROS and registers are divided into two sets. Each set services one of the execution units. During the instruction decode phase, the particular set of control ROS and registers are chosen on the basis of which execution unit executes the particular instruction class the instruction represents. If the register file can be accessed twice per cycle, no additional output ports will be necessary; otherwise, additional output ports and an input port would be necessary to service the parallel execution of the two execution units.

Additional arithmetic function units such as multipliers and dividers and an additional ALU can be added to either of the execution units to distribute the work load more evenly. Address calculation can be off-loaded from the ALU and further equalize the distribution of the workload by adding an additional adder to one of the execution units. A compiler designed to distribute the instruction execution between the two execution units evenly can also help to achieve significant increases in processor speed.

The invention is characterized by the low cost, simplicity of design and the minimization of additional hardware necessary to achieve the increase in processor speed.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF THE PREFERRED EMBODIMENTS OF THE INVENTION

Figure 1:
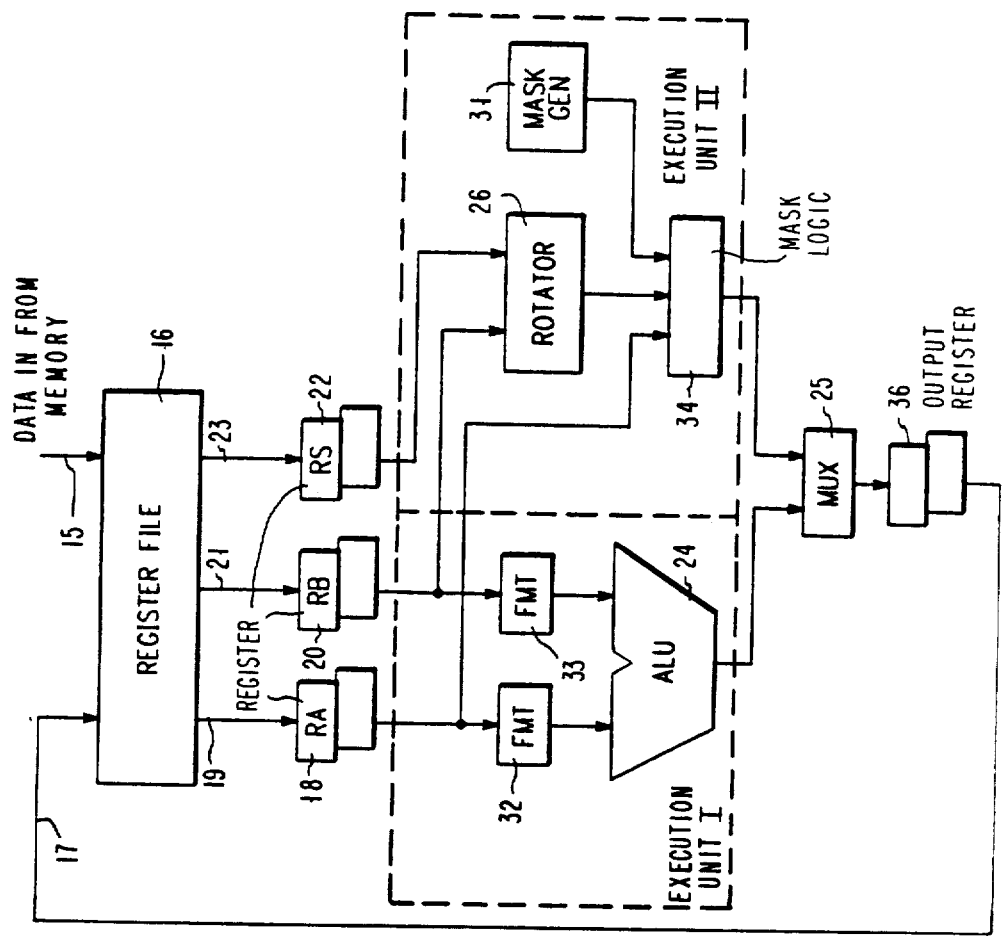
FIG. 1 is a block diagram of a sequentially operated RISC processor and represents prior art.
Figure 1:
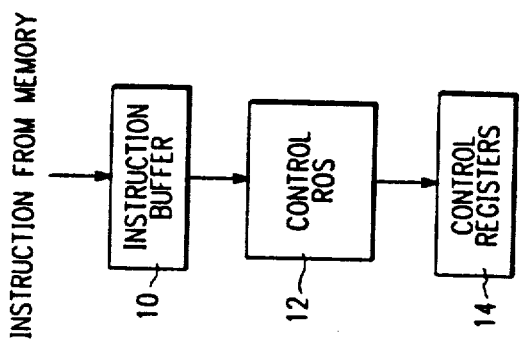

In the several figures of the drawings, like reference numerals indicate identical or functionally similar elements. Referring now to the drawings, and more particularly to FIG. 1, there is depicted a diagram for a RISC sequentially operated processor. This processor is deemed prior art as described in the background of the invention. The decoding flow of an instruction is shown on the left while the instruction execution is depicted on the right. The instruction flows from the instruction buffer 10 to the control Read Only Storage (ROS) 12 to the control registers 14. As will be apparent to those skilled in the art, the address of the particular general purpose register in which the various operands are to be stored or from which they are to be fetched are specified in the various fields of the instruction buffer 10.

The basic CPU includes an input port 15 for data to flow from memory into the five port general purpose register file 16 containing thirty-two individual registers in this example. As one of ordinary skill in the art would recognize, the register file could contain various combinations of registers and ports and still accommodate this approach. The second input port 17 contains the results of the instruction from one of the two execution units. The two basic execution units are responsible for carrying out the instructions of the processor including adds, multiplies, divides, rotates, loads and stores. In FIG. 1, the execution units are divided into two functional units. Execution unit I contains the ALU 24, while execution unit II contains the rotator 26. The two input ports 15 and 17 to the register file 16 indicate the particular instruction designated operands set forth in the instruction. Most instructions use only one of the two execution units. That means that one of the two execution units is idle while the other is executing.

The processor pipeline starts with the decoding of the instruction. During the instruction decode cycle, the register file is accessed and the fetched operands are latched at staging registers 18, 20 and 22 in parallel with the decoding of the instruction by the control ROS 12 and latching up the instruction information in the control registers 14. At the next pipeline stage execute cycle, registers 18, 20 and 22 feed into one of the two execution units. The result of the execution is latched in the output register 36. In the following cycle, the register information is written into the register file 16 in the put away stage of the pipeline.

Instruction information flows from the register file 16 through the output ports 19, 21 and 23, respectively, to the staging registers 18, 20, and 22. Staging registers 18 and 20 pass information to the formatters 32 and 33. The formatters are responsible for padding with zeros or ones to prepare for arithmetic or logic executions. The formatters 32 and 33 feed into the Arithmetic and Logic Unit (ALU) 24, which performs two operand instructions and supplies the results to the multiplexer 25. The rotator 26 in combination with the mask generator 31 and the mask logic 34 performs a one-machine cycle executable mask and rotate operation set forth in more detail in U.S. Pat. No. 4,569,016 and supplies its results to the multiplexer 25. The mask generator 31 is responsible for generating the masks for control of the output from the rotator 26 flowing into the merge logic 34. The merge logic 34 uses the output from staging register 18 to control the instruction that the merge logic 34 will perform. For example, if the output from staging register 18 specifies a rotate then mask insert (RMI) instruction, the contents of register 22 are rotated left the number of positions specified by bits 27–31 of register 20. The shifted data is output to the multiplexer 25 under the control of the mask generator 31 by the mask logic 34. The mask logic 34 first zeros the output register 36 and then checks each bit of the mask and determines if it is a one or zero. If a mask bit is a one, the associated bit of the rotated data (zero or one) will be placed into the output register; if the mask bit is a zero, the associated data bit from the output register will remain unchanged. The multiplexer 25 is responsible for taking the output from the two execution units and storing it in the output register 36 which passes information to the input port 17 of the register file 16.

The instruction buffer 10, the control ROS 12 and the control registers 14 are common to all of the figures. The inputs 15 and 17 and outputs 19, 21 and 23 of the register file 16 are also common to all of the figures. The staging registers 18, 20 and 22 are used in all the figures. Execution unit I will contain the formatters 32 and 33, and the ALU 24 in all the figures. Execution unit II will contain the mask generator 31, the mask logic 34 and the rotator 26 in all of the figures.

Figure 2:
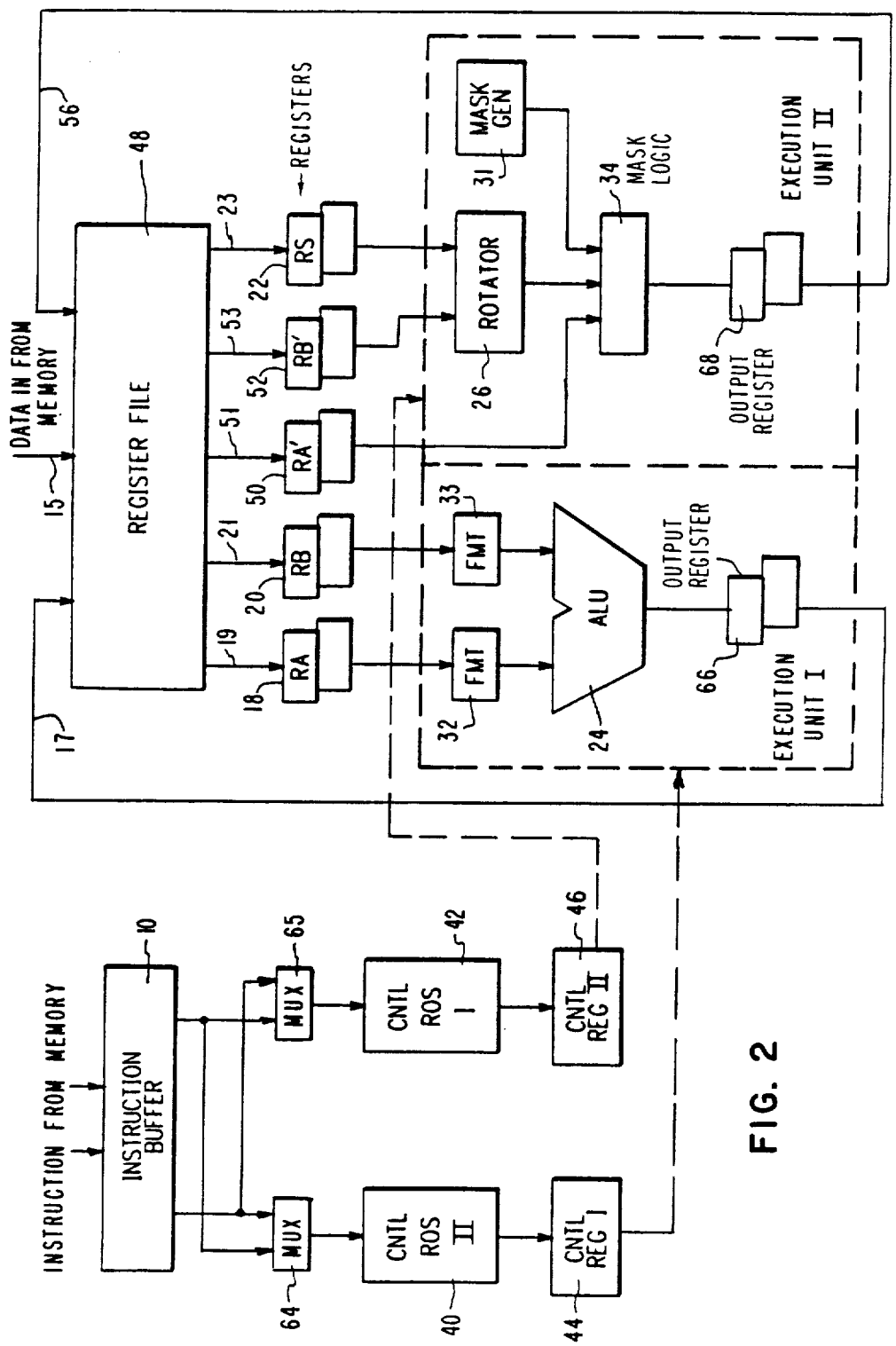
FIG. 2 is a block diagram of a parallel operated RISC processor, and the first embodiment of the invention.

The first embodiment of the invention is presented in FIG. 2. The decoding of an instruction is shown on the left. The instruction flows from the instruction buffer 10 through the two multiplexers 64 and 65 to the two control ROSs 40 and 42 to the control registers 44 and 46. The addition of the two multiplexers 64 and 65 between the instruction buffer 10 and the two control ROSs 40 and 42 makes it possible to pass instruction information to the two execution units simultaneously. On the basis of the instruction, the instruction information is obtained from one or the other control ROS.

The instruction processing has an expanded eight port register file 48 which replaces the five port register file shown in FIG. 1. The additional two output ports 51 and 53 are employed exclusively by execution unit II. Each execution unit has its own input port 17 and 56 to the register file 48. Execution unit I employs input port 17, while execution unit II uses input port 56. The addition of separate output registers 66 and 68 for each execution unit permits the storing of output information before sending it on to the register file input ports 17 and 56, respectively. Moreover, the use of two output registers 66 and 68 provides output of the execution units' results to the register file 48, simultaneously.

The addition of two more output ports and one more input port for the register file 48, provides the processor with the capability of executing ALU and rotate instructions simultaneously, while remaining free of data integrity problems or complex interfaces by sharing the register file. With the code scheduling capability in a compiler, it is possible to minimize the data dependency between two parallel instructions by separating the instructions so that the second of the two parallel instructions does not have the same source register as the destination register of the first instruction. A compiler can also schedule the two categories of instructions to avoid consecutive rotate or ALU instructions. With these hardware and compiler optimizations, the processor performance comparison to the original sequentially operated processor is presented below.

---

PP = OPP - [ % ROT * CPR ] + CONTP, where: CONTP = Contention Penalty
= Summation (% CONT * CPC)
= (% CONTA * CPC) +
(% CONTB * CPC)
PP = Processor Performance in Number Of Cycles Per Instruction
OPP = Original Processor Performance In Number of Cycles Per Instruction
% ROT = Percentage of Rotate Instructions
CPR = Number of Cycles Per Rotate Instruction
% CONT = Percentage of Data Dependency and Resource Contention
CPC = Number of Cycle Penalties Per Contention
% CONTA = Percentage of Contention Due to Data Dependency between Unit I and Unit II
% CONTB = Percentage of Contention Due to Consecutive Instructions in Unit II

---

Some systems have branch prediction capability. These systems have an instruction cache to prefetch instructions and preprocess the branch instructions. In these systems, the processor never executes a branch instruction. This feature provides additional gains in the processor performance for this invention, because now the processor does not have to wait for the branch instruction to be resolved. The instruction after the branch can be executed in parallel with the instruction before the branch instruction. In a system without the branch prediction capability, the branch would have to be resolved before the next instruction could be performed. By freeing the ALU 24 from any involvement in the branch instruction, the ratio between the two execution units will be more balanced leading to less contention for one of the execution units and better performance. Instructions from the instruction buffer 10 will go to two separate control ROSs 40 and 42 immediately, depending on the instruction category, to generate control signals for the two independent execution units. This functionally splits the ROS 12 shown in FIG. 1 into two ROSs 40 and 42 shown in FIGS. 2, 3, 5 and 6, with very little duplication from the instructions that use both of the execution units. Only the opcode inputs to the control ROS 12 are duplicated but not the control registers 14.

The amount of hardware for the control decode section is very similar between the first embodiment of the invention shown in FIG. 2 and the prior art shown in FIG. 1. The data flow remains the same except the register file 48 requires two more output ports 51 and 53 and one more input port 56. These three ports lead to three more buses running across the data flow. However, since the width of the data flow is probably limited by the width of the execution units these three buses would not increase the area of the data flow. A small amount of additional control logic is necessary to handle the data dependency, resource contention and exception conditions.

Figure 3:
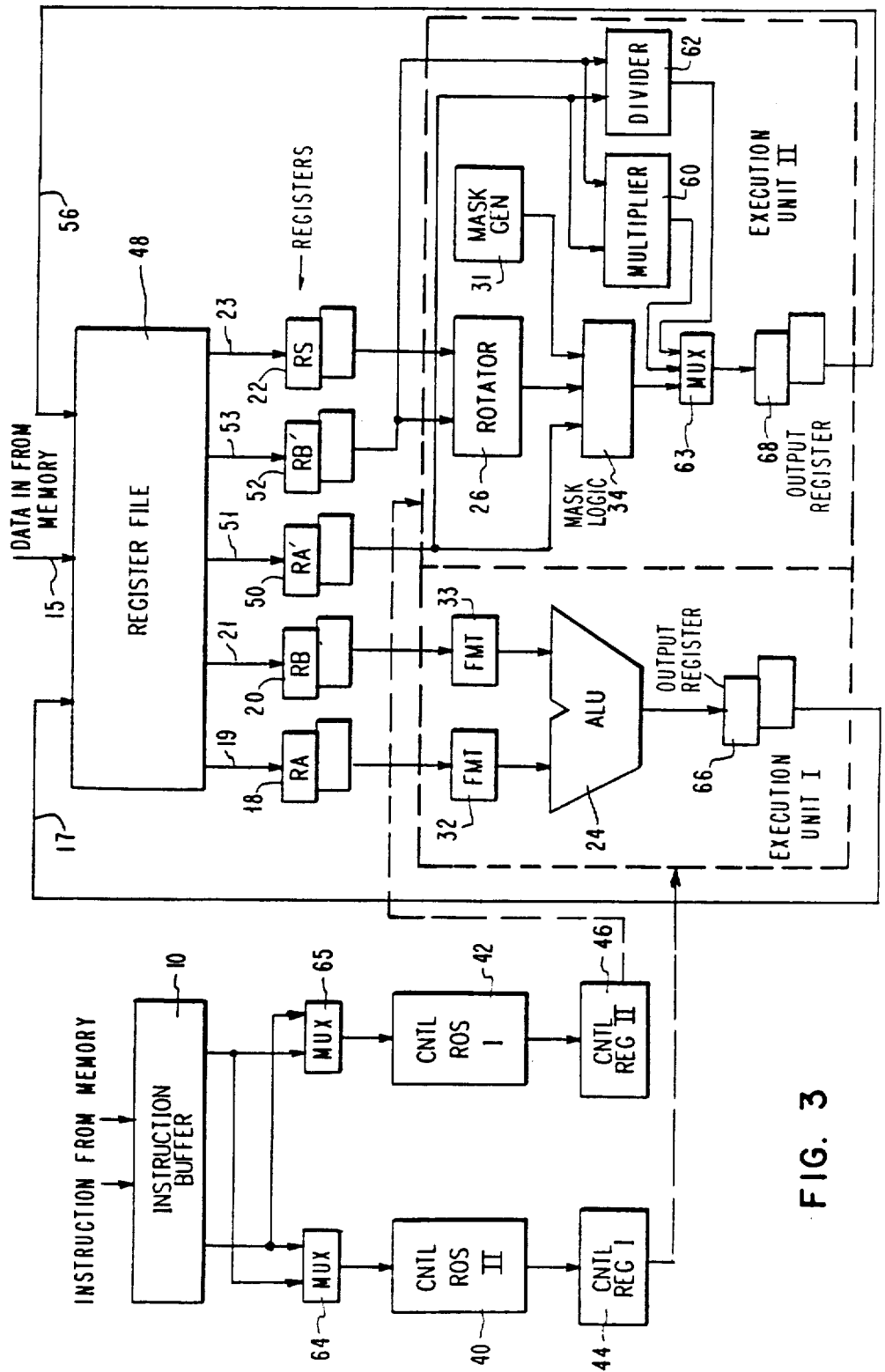
FIG. 3 is a block diagram of a parallel operated RISC processor, and the first embodiment with an additional multiplier and divider.

FIG. 3 is the same as the first preferred embodiment except for the addition of two functional units in execution unit II; the multiplier 60 and the divider 62. The output ports 51 and 53 which flow into staging registers 50 and 52 are used as inputs to the multiplier 60 and the divider 62, and an additional multiplexer 63 accommodates the outputs from the mask logic, the multiplier and the divider and stores the output in the output register 68. Functional units such as a multiplier 60 or a divider 62 are grouped into the execution unit with the lowest percentage of instructions as depicted in FIG. 3. This will balance the ratio between the two units and improve the processor performance.

The special situations for the first embodiment of the invention shown in FIGS. 2 and 3 are summarized below:

(1) The second of two parallel instructions needs the results of the first one.

(2) Two parallel instructions belong to the same instruction category.

(3) One of the parallel instructions takes more cycles than the other. In this case the faster unit has to wait for the slower one so that the instructions are executed in sequence.

(4) One of the parallel instructions needs both execution units; i.e., Rotate and Store.

(5) Logic is needed to keep two parallel instructions from executing out of sequence; ie., two parallel instructions have the same destination register so one has to be cancelled, or if one of the parallel instructions causes an exception interrupt, the other one has to be completed or aborted before the exception processing commences.

The first condition can be eliminated by the compiler code scheduling. The compiler can also interleave rotate and ALU instructions to minimize contention. The third and fourth condition does not happen often because a RISC processor has primitive instructions, and very few instructions require more than one cycle. Those that do are very rarely used. The exception condition mentioned as the fifth problem is a slight increase to the exception handling hardware in the prior art.

The only increase for the first embodiment is the three extra ports in the register file. This will only increase the register file size by about one-half the original register file size which is about 5 to 8% of the total chip size. The register file can be designed for two accesses during one cycle. This design allows the register file size to remain constant. The only additional increase to the hardware are the three extra buses on top of the data flow.

Figure 4:
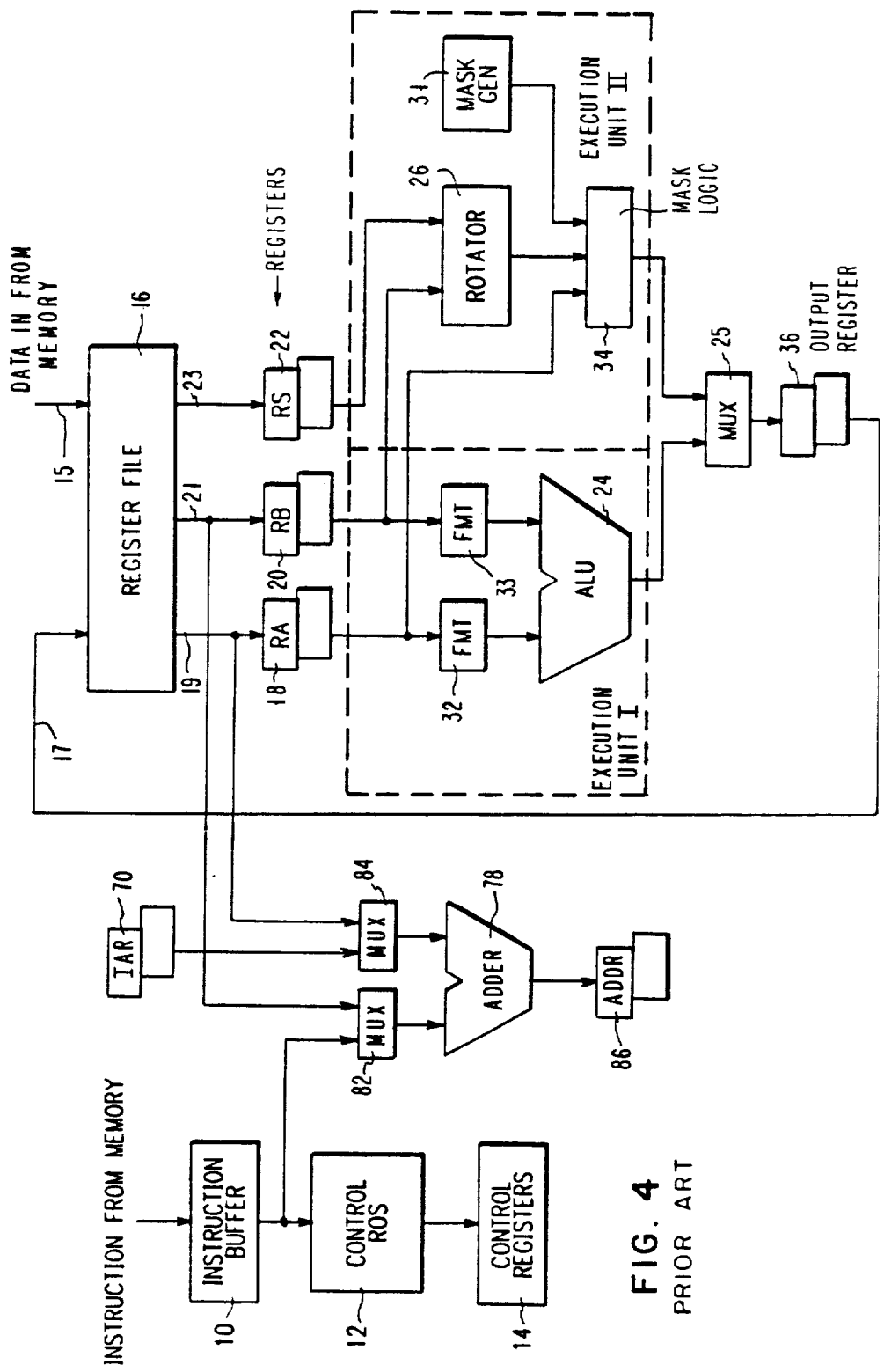
FIG. 4 is a block diagram of a sequentially operated RISC processor with address generation performed at decode cycle and represents prior art.

FIG. 4 is a prior art depiction of a sequentially operated processor with address generation at decode cycle. The hardware is the same as FIG. 1 with the exception that the output of an Instruction Address Register (IAR) 70 is multiplexed via a multiplexer 84 with the output port 19 of the register file 16 to form one of the two operand inputs to an adder 78. Multiplexer 82 is used to multiplex the information from the instruction buffer 10 or the output port 21 of the register file 16 for the other operand input to the adder 78. The adder 78 calculates the new address without ALU interruption. The new address is stored in address register 86.

Figure 5:
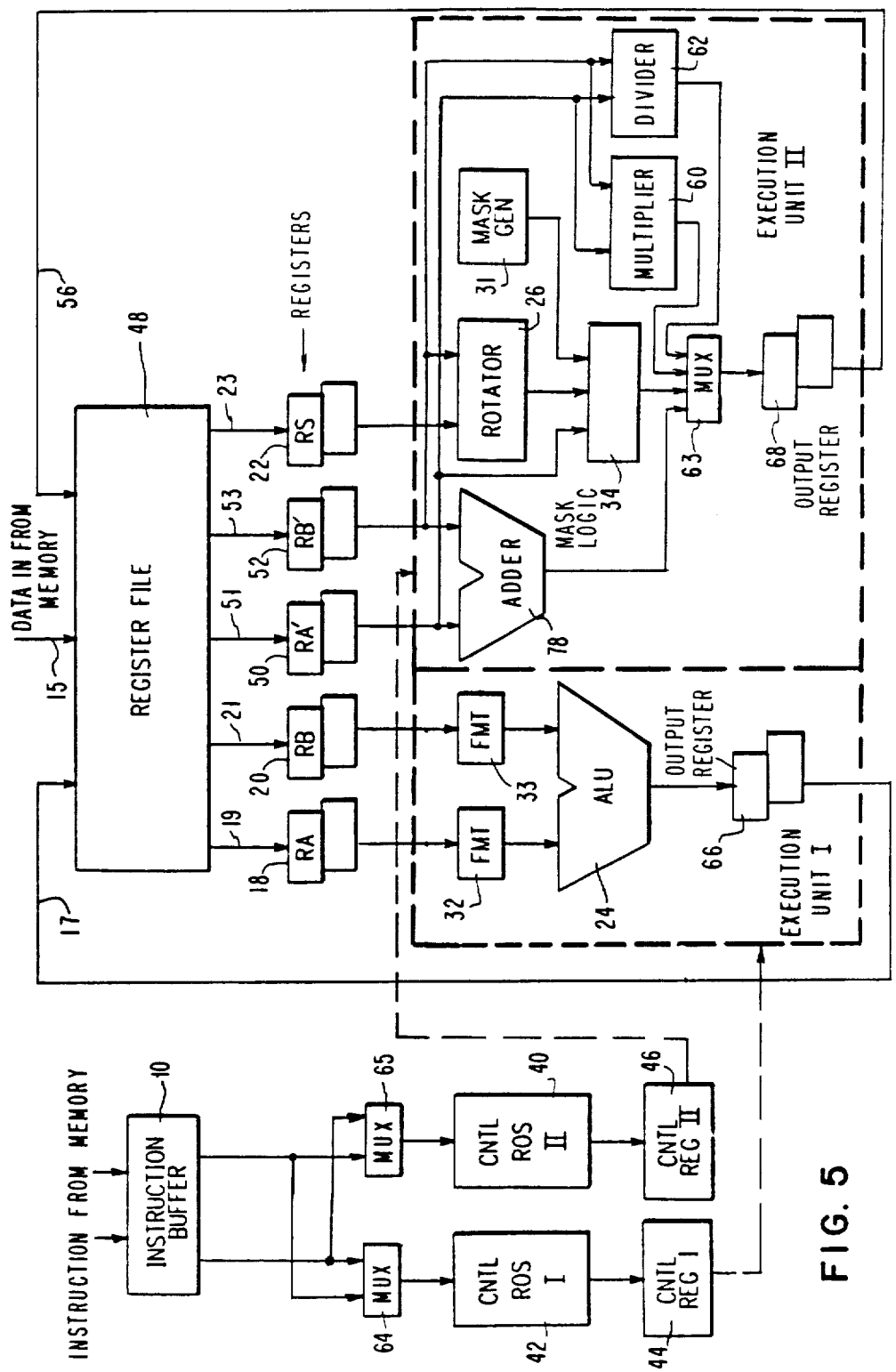
FIG. 5 is a block diagram of a parallel operated RISC processor, and the second embodiment of the invention.

In FIG. 5, the second embodiment of the invention is presented. The difference between the first embodiment shown in FIG. 2 or 3 and the second embodiment is the incorporation of the adder 78 presented in FIG. 4. The adder 78 receives operand inputs from the register file 48 output ports 51 and 53 via the staging registers 50 and 52. The adder 78 outputs its result to multiplexer 70 which multiplexes the outputs of the mask logic 34, the multiplier 60 and the divider 62 with the output from the adder 78 for storage into the output register 68. The extra adder 78 is used to do address calculation in order to speed up the load, store and branch instructions and is grouped in with the rotator 26 in execution unit II to balance the instruction mix of the execution units. Execution unit II is responsible for handling all the rotate, shift, load, store, multiply, divide and address calculation instructions. Execution unit I will handle all the arithmetic and logical computations. The RISC average instruction mix comprises 54% register to register transfer, 20% load, 10% store and 16% branch instructions. Within the register-to-register transfer instructions, 5 to 10% are rotate/shift instructions. By segmenting the arithmetic and logic instructions, a better balancing of the workload is achieved. With code scheduling performed by the compiler to interleave these two categories of instructions, the data dependency and resource contention between the two units can be eliminated. The only major performance degradation is from multiple cycle instructions which are virtually non-existent in a RISC processor. The formula presented below represents the processor performance comparison of the second embodiment shown in FIG. 5 to the original sequentially operated processor of the prior art shown in FIG. 4.

| PP = 2 * OPP - Summation (% MCI * CPMCI)i - CONTP |
|---|
| Where: CONTP = Contention Penalty<br>= Summation (% CONTA * CPC) +<br>(% CONTB * CPC) +<br>(% CONTC * CPC)<br>% MCI = Percentage of Multiple Cycle Instruction i<br>CPMCI = Number of Cycle per Multiple Cycle Instruction i<br>% CONTA = Percentage of Contention Due to Data Dependency between Unit I and Unit II<br>% CONTB = Percentage of Contention Due to Consecutive Instructions in Unit I<br>% CONTC = Percentage of Contention Due to Consecutive Instructions in Unit II |

The control section will be similar to the first embodiment of the invention, except the control ROSs 40 and 42 will have to be repartitioned according to the two instruction categories for the second embodiment of the invention. Except for the additional adder 78, the hardware increase will be identical to the first embodiment.

Figure 6:
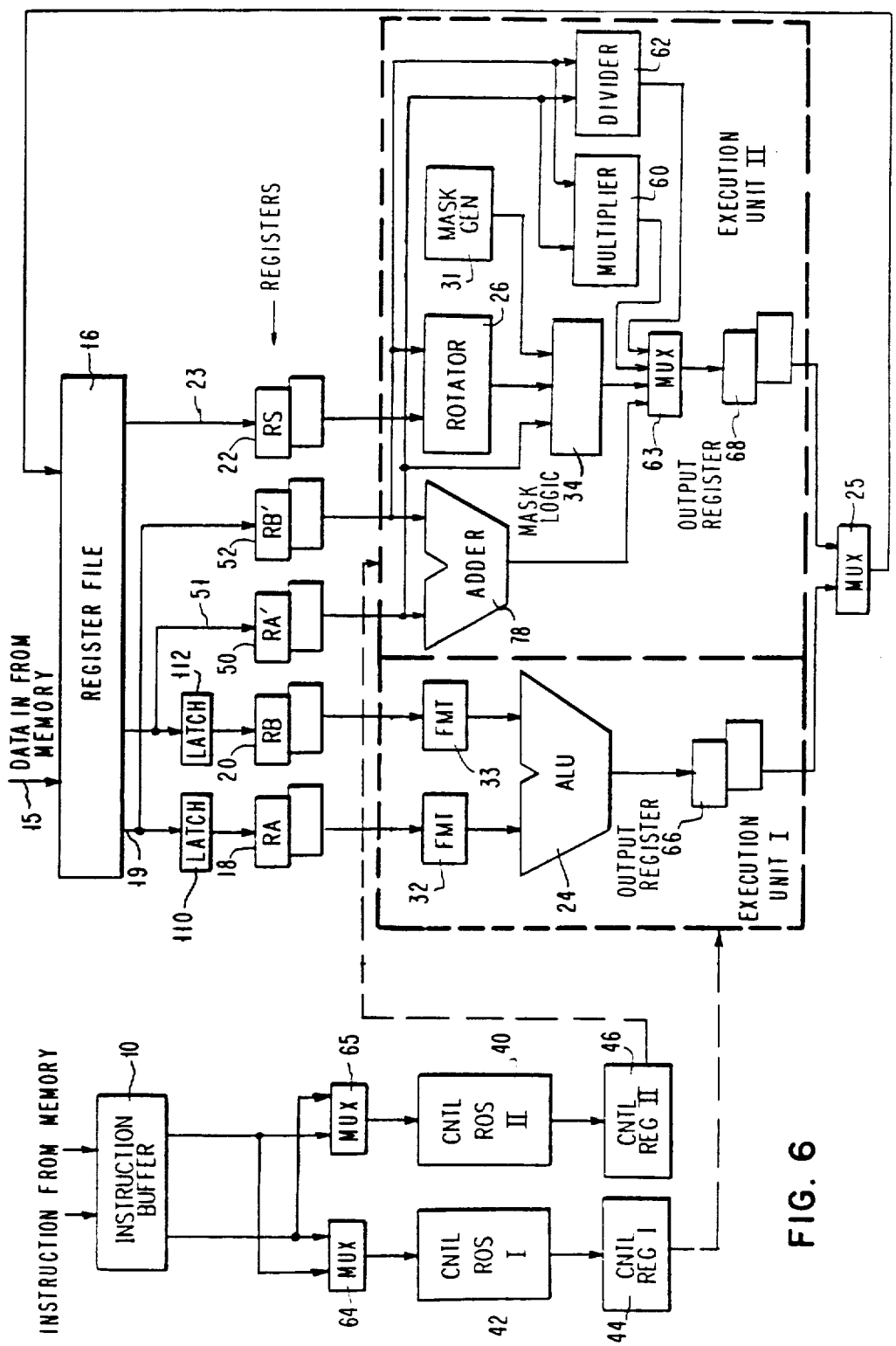
FIG. 6 is a block diagram of a parallel operated RISC processor, and the second embodiment of the invention with the register file accessed twice in one cycle.

FIG. 6 is an example of a parallel operated processor with a register file designed for two accesses per cycle. FIG. 6 is identical to FIG. 5 except for the addition of two latches 110 and 112 which control the first register file access, the addition of a multiplexer 25 to accept the output registers 66 and 68 of the two execution units and the use of the original five port register file 16. The latches 110 and 112 are located on the output ports 19 and 21 just above the staging registers 18 and 20. The latches are triggered by each half of the clock cycle. In the first half of the clock cycle, the output ports 19 and 21 flow to latches 110 and 112. In the second half of the clock cycle, the output ports 19 and 21 flow to the staging registers 50 and 52 and the output register 68 flows through the multiplexer 25 and into the input port 17 of the register file 16. Also in the second half of the clock cycle, the latches 110 and 112 flow to the staging registers 18 and 20 and the output register 66 flows through the multiplexer 25 and into the input port 17 of the register file 16. This allows parallel processing of the two execution units without the addition of two more output ports and one more input port.

Figure 7:
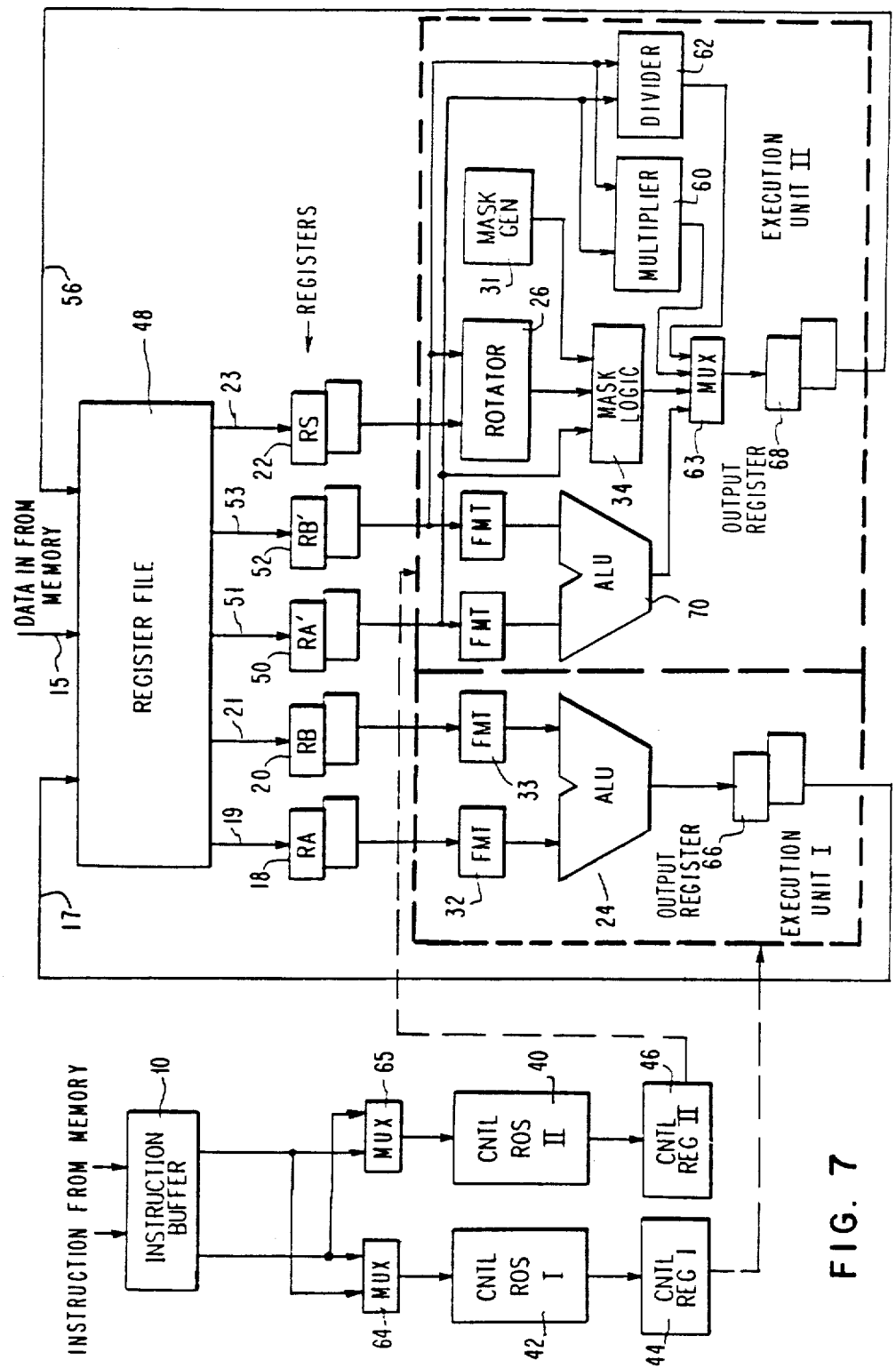
FIG. 7 is a block diagram of a parallel operated RISC processor, and the third embodiment of the invention.

FIG. 7 represents the third embodiment of the invention. The third embodiment is the same as the first embodiment except that an additional ALU 90 has been added, with the accompanying formatters 100 and 102, to the execution unit II. The register file 48 output ports 51 and 53 feed the staging registers 50 and 52 which flow into the formatters 100 and 102 that provide inputs to the ALU 90. The output of the second ALU 90 is multiplexed in a similar fashion as the output of the adder 78 of FIGS. 5 and 6. The output of the second ALU 90 is multiplexed with the output of the mask logic 34, the multiplier 60 and the divider 62 into the multiplexer 70 which flows into the output register 68.

The third embodiment can be employed as depicted in FIG. 7, to decrease the burden on the compiler to perform code scheduling and increased balancing of the instruction load. The control ROS 40 is identical to the original control ROS 12. The control ROS 42 has ALU instruction capability only.

The drawback to this approach is the additional hardware expense of the extra ALU and extra control ROS 42 in order to execute ALU instructions in both execution units. The advantage is the reduction in the complexity of the compiler.

While the invention has been described in terms of certain preferred embodiments, those skilled in the art will recognize that the invention can be practiced with modification and alteration within the spirit and scope of the appended claims.

Having thus described our invention, what we claim as new and desire to secure by Letters Patent is as follows:

1. In a reduced instruction set computer processing system having instruction handling apparatus comprising an instruction buffer, control read only storage and control registers and instruction execution apparatus comprising a register file having inputs and outputs, one of said inputs being connected to receive data from memory, staging registers connected to said register file outputs, and first and second execution units, said first execution unit comprising an arithmetic logic unit having inputs connected to two of said staging registers, said second execution unit comprising a rotator and mask generator means having inputs connected to three of said staging registers, said arithmetic logic unit and said rotator and mask generator means having outputs, a first output register for receiving the outputs of said arithmetic logic unit or said rotator and mask generator means and supplying an input to said register file wherein the system performs sequential data manipulations under the control of instructions, said instructions being executed by one of said first and second execution units, the improvement which increases the throughput of the computer comprising:

said control read only storage comprising first and second segments for respectively storing instruction sets for said first and second execution units;

said instruction handling apparatus further including means for routing instructions from said first segment of said control read only storage to said first execution unit and means for routing instructions from said second segment of said control read only storage to said second execution unit;

a second output register, the outputs from said arithmetic logic unit and said rotate and mask generator means being separately connected to a respective one of said first and second output registers, outputs from each of said output registers being connected to inputs of said register file; and said first execution unit and said second execution unit simultaneously receiving outputs from said staging registers connected to outputs of said register file and executing in parallel.

2. A reduced instruction set computer as recited in claim 1 further comprising:

at least one arithmetic function unit in said second execution unit, said arithmetic function unit having inputs connected to two of said three staging registers and providing an output; and a multiplexer connected to receive the outputs of said rotate and mask generator means and said at least one arithmetic function unit and supplying one of said outputs to said second output register.

3. A reduced instruction set computer as recited in claim 2 wherein said at least one arithmetic function unit comprises a multiplier and a divider.

4. A reduced instruction set computer as recited in claim 2 wherein said at least one arithmetic function unit comprises an adder, said adder being used to compute the addresses of instructions to speed up load, store and branch instructions.

5. A reduced instruction set computer as recited in claim 4 wherein said at least one arithmetic function unit further comprises a multiplier and divider.

6. A reduced instruction set computer as recited in claim 2 wherein said at least one arithmetic function unit comprises a second arithmetic logic unit whereby code scheduling and load balancing of the instruction load may be performed between said first and second execution units.

7. A reduced instruction set computer as recited in claim 1 further comprising two latches connected to two outputs of said register file, said two latches having outputs connected to said two of said staging registers, said three of said staging registers being directly connected to three outputs of said register file including the two outputs connected to said two latches whereby said register file makes two accesses to memory for each clock cycle of said computer.

8. A reduced instruction set computer as recited in claim 1 wherein said register file has at least five outputs and wherein there are at least five staging registers, one staging register of each of said outputs, and wherein said two of said staging registers are connected exclusively to said first execution unit and said three of said staging registers are connected exclusively to said second execution unit.

9. In a reduced instruction set computer processing system having instruction handling apparatus comprising an instruction buffer, control read only storage and control registers, an adder for calculating an instruction address and instruction execution apparatus comprising a register file having inputs and outputs, one of said inputs being connected to receive data from memory, staging registers connected to said outputs, and first and second execution units, said first execution unit comprising an arithmetic logic unit having inputs connected to two of said staging registers, said second execution unit comprising a rotator and mask generator means having inputs connected to three of said staging registers, said arithmetic logic unit and said rotator and mask generator means having outputs, a first output register for receiving the outputs of said arithmetic logic unit or said rotator and mask generator means and supplying an input to said register file wherein the system performs sequential data manipulations under the control of instructions, said instructions being executed by one of said first and second execution units, the improvement which increases the throughput of the computer comprising:

said control read only storage comprising first and second segments for respectively storing instruction sets for said first and second execution units;

said instruction handling apparatus further including means for routing instructions from said first segment of said control read only storage to said first execution unit and means for routing instructions from said second segment of said control read only storage to said second execution unit;

said adder being in said second execution unit and having inputs connected to two of said three of said staging registers;

a multiplexer in said second execution unit connected to receive outputs from said adder and said rotate and mask generator means;

a second output register, the outputs from said arithmetic logic unit and said multiplexer being separately connected to a respective one of said output registers, outputs from each of said first and second output registers being connected to inputs of said register file; and said first execution unit and said second execution unit simultaneously receiving outputs from staging registers connected to outputs of said register file and executing in parallel.

10. A reduced instruction set computer as recited in claim 9 further comprising at least one arithmetic function unit in said second execution unit, said arithmetic function unit having inputs connected to two of said three staging registers and providing an output connected to said multiplexer.

11. A reduced instruction set computer as recited in claim 10 wherein said at least one arithmetic function unit comprises a multiplier and a divider.

12. A reduced instruction set computer as recited in claim 9 further comprising two latches connected to two outputs of said register file, said two latches having outputs connected to said two of said staging registers, said three of said staging registers being directly connected to three outputs of said register file including the two outputs connected to said two latches whereby said register file makes two accesses to memory for each clock cycle of said computer.

13. A reduced instruction set computer as recited in claim 9 wherein said register file has at least five outputs and wherein there are at least five staging registers, one staging register of each of said outputs, and wherein said two of said staging registers are connected exclusively to said first execution unit and said three of said staging registers are connected exclusively to said second execution unit.

14. In a reduced instruction set computer processing system having instruction handling apparatus comprising an instruction buffer, control read only storage and control registers and instruction execution apparatus comprising a register file having inputs and outputs, one of said inputs being connected to receive data from memory, staging registers connected to said register file outputs, and first and second execution units, said first execution unit comprising a first arithmetic logic unit having inputs connected to two of said staging registers, said second execution unit comprising a rotator and mask generator means having inputs connected to three of said staging registers, said first arithmetic logic unit and said rotator and mask generator means having outputs, a first output register for receiving the outputs of said arithmetic logic unit or said rotator and mask generator means and supplying an input to said register file wherein the system performs sequential data manipulations under the control of instructions, said instructions being executed by one of said first and second execution units, the improvement which increases the throughput of the computer comprising:
  said control read only storage comprising first and second segments for respectively storing instruction sets for said first and second execution units;
  said instruction handling apparatus further including means for routing instructions from said first segment of said control read only storage to said first execution unit and means for routing instructions from said second segment of said control read only storage to said second execution unit;
  a second arithmetic logic unit in said second execution unit and having inputs connected to two of said three of said output staging registers;
  a multiplexer in said second execution unit connected to receive outputs from said second arithmetic logic unit and said rotate and mask means;
  a second output register, the outputs from said first arithmetic logic unit and said multiplexer being separately connected to a respective one of said first and second output registers, outputs from each of said first and second output registers being connected to inputs of said register file; and
  said first execution unit and said second execution unit simultaneously receiving outputs from said staging registers connected to outputs of said register file and executing in parallel.

15. A reduced instruction set computer as recited in claim 14 further comprising at least one arithmetic function unit in said second execution unit, said arithmetic function unit having inputs connected to two of said three staging registers and an output connected to said multiplexor.

16. A reduced instruction set computer as recited in claim 15 wherein said at least one arithmetic function unit comprises a multiplier and a divider.

17. A reduced instruction set computer as recited in claim 14 further comprising two latches connected to two outputs of said register file, said two latches having outputs connected to said two of said staging registers, said three of said staging registers being directly connected to three outputs of said register file including the two outputs connected to said two latches whereby said register file makes two accesses to memory for each clock cycle of said computer.

18. A reduced instruction set computer as recited in claim 14 wherein said register file has at least five outputs and wherein there are at least five staging registers, one staging register of each of said outputs, and wherein said two of said staging registers are connected exclusively to said first execution unit and said three of said staging registers are connected exclusively to said second execution unit.

* * * * *